H. W. ROLAND.
Machines for Shrinking Tires.

No. 169,042. Patented Oct. 19, 1875.

WITNESSES
Henry N. Miller
C. L. Euerh

INVENTOR
Henry W. Roland,
By Alexander Mason
Attorney

UNITED STATES PATENT OFFICE.

HENRY W. ROLAND, OF LONDON, OHIO.

IMPROVEMENT IN MACHINES FOR SHRINKING TIRES.

Specification forming part of Letters Patent No. 169,042, dated October 19, 1875; application filed September 18, 1875.

*To all whom it may concern:*

Be it known that I, HENRY W. ROLAND, of London, in the county of Madison and in the State of Ohio, have invented certain new and useful Improvements in Machine for Shrinking Tire, and other purposes; and do hereby declare that the following is a full, clear, and exact description thereof, reference being had to the accompanying drawings, and to the letters of reference marked thereon, making a part of this specification.

The nature of my invention consists in the construction and arrangement of the parts of a tire-upsetting machine, the peculiarities of which will be hereinafter fully set forth.

Figure 1:
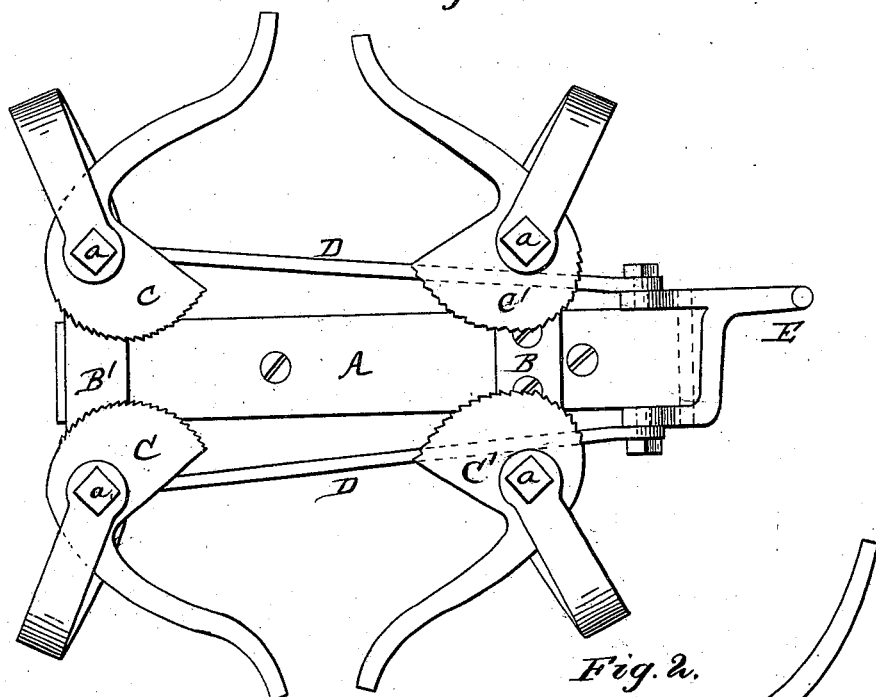
Figure 2:
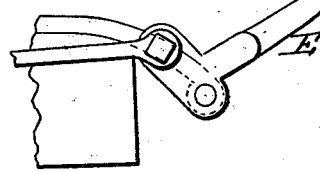
Figure 3:
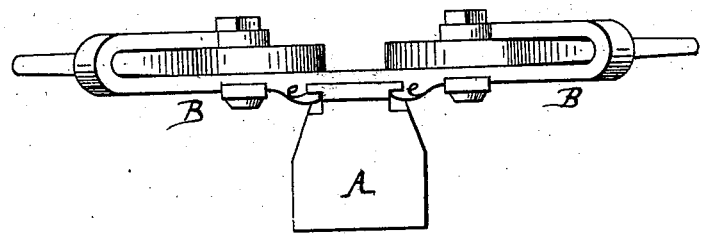

In the annexed drawings, which make a part of this specification, Figure 1 represents a plan view of my machine; Fig. 2, a section of a portion of it; and Fig. 3 an end view.

In the figures, A represents the base upon which the working parts of the machine are secured. B and B' represent two bars of metal, which are secured upon the base A, and crosswise of it. The ends of these bars are turned over and brought back toward the base, and a bolt, a, is passed through the two parts and through a cam-lever, C or C'. There are four of these levers, C C and C' C', the levers C' C' being on a stationary bar, and the other two on a movable bar. While the bar B' is secured to the base A it is at the same time movable on it. The faces of the cams of these levers are serrated, as represented. The under side of the bar B' is provided with lugs or flanges which take into grooves in the base A, and act as guides when the bar moves. D D represent two iron rods, which are secured at one end to the bar B', on different sides of the base. These rods pass to the other end of the base, and are there secured to the short arms of a divided lever. This lever E is pivoted to, and has its fulcrum in, the base A, and having its inner end divided into two parts it operates both of the rods simultaneously.

In using this machine the tire to be upset is first heated to a welding-heat, and then, being placed upon the machine, between the cam-levers, said levers are turned so as to close upon and clamp it tightly. By bearing down then on the lever E, through rods D D, draw the bar B' and its cam-levers toward the levers C' C', and thus compress the tire so as to shorten it. The upsetting can be regulated by the distance the lever E is moved.

Having thus fully described my invention, what I claim as new, and desire to secure by Letters Patent, is—

The bars B B', the one movable and the other stationary, their ends turned over to embrace and hold the cam-levers C C', in combination with the rods D D and the divided lever E, as for the purpose set forth.

In testimony that I claim the foregoing I have hereunto set my hand this 6th day of September, 1875.

HENRY W. ROLAND.

Witnesses:
JAS. S. CRAIN,
S. R. WILLIAMS.